United States Patent
Tellermann et al.

(10) Patent No.: US 8,790,216 B2
(45) Date of Patent: Jul. 29, 2014

(54) DEVICE AND METHOD FOR OPERATING A DRIVE HAVING AN ELECTRICALLY DRIVABLE AXLE

(75) Inventors: Uwe Tellermann, Reutlingen (DE); Kaspar Schmoll Genannt Eisenwerth, Vaihingen-Horrheim (DE)

(73) Assignee: Robert Bosch GmbH, Stuttgart (DE)

( * ) Notice: Subject to any disclaimer, the term of this patent is extended or adjusted under 35 U.S.C. 154(b) by 516 days.

(21) Appl. No.: 12/998,052

(22) PCT Filed: Jul. 28, 2009

(86) PCT No.: PCT/EP2009/059722
§ 371 (c)(1),
(2), (4) Date: May 19, 2011

(87) PCT Pub. No.: WO2010/028908
PCT Pub. Date: Mar. 18, 2010

(65) Prior Publication Data
US 2011/0266112 A1     Nov. 3, 2011

(30) Foreign Application Priority Data
Sep. 12, 2008   (DE) .......................... 10 2008 042 056

(51) Int. Cl.
*B60W 10/02* (2006.01)
*B60W 10/08* (2006.01)

(52) U.S. Cl.
USPC ............................................................. 477/8

(58) Field of Classification Search
USPC ........ 475/3, 5, 6, 7, 8, 14, 166, 181; 477/3, 5, 477/6, 7, 8, 14, 166, 181
See application file for complete search history.

(56) References Cited

U.S. PATENT DOCUMENTS

| | | | | |
|---|---|---|---|---|
| 5,765,671 A | * | 6/1998 | Endo et al. | 192/48.2 |
| 6,008,606 A | * | 12/1999 | Arai et al. | 318/431 |
| 7,023,152 B2 | * | 4/2006 | Sunaga et al. | 318/34 |
| 7,386,381 B2 | * | 6/2008 | Matsushima et al. | 701/51 |
| 2004/0154853 A1 | | 8/2004 | Aikawa et al. | |
| 2007/0060432 A1 | * | 3/2007 | Van Druten et al. | 475/5 |
| 2008/0009379 A1 | * | 1/2008 | Steinwender | 475/5 |
| 2009/0250278 A1 | * | 10/2009 | Kawasaki et al. | 180/65.275 |

FOREIGN PATENT DOCUMENTS

| | | |
|---|---|---|
| DE | 199 15 370 | 10/2000 |
| DE | 10 2006 031 | 1/2008 |
| DE | 10 2006 044 427 | 4/2008 |
| DE | 10 2007 010 370 | 9/2008 |
| EP | 0 224 144 | 6/1987 |
| EP | 1 122 110 | 8/2001 |
| WO | WO 01/07278 | 2/2001 |
| WO | WO 01/83249 | 11/2001 |

* cited by examiner

*Primary Examiner* — Edwin A Young
(74) *Attorney, Agent, or Firm* — Kenyon & Kenyon LLP

(57) ABSTRACT

A drive device for a vehicle includes an electric machine and an axle which is drivable by the electric machine. A disengageable mechanical coupling is provided between the drivable axle and the electric machine. This coupling is designed as a jaw coupling.

13 Claims, 1 Drawing Sheet

DEVICE AND METHOD FOR OPERATING A DRIVE HAVING AN ELECTRICALLY DRIVABLE AXLE

BACKGROUND OF THE INVENTION

1. Field of the Invention

The present invention relates to a device and a method for operating a drive having an electrically drivable axle, for example in a hybrid vehicle.

2. Description of Related Art

Vehicles having a hybrid drive structure have at least two drive units. These are usually an internal combustion engine and at least one electric motor. However, the use of other drive units such as hydraulic motors, for example, is also possible. Thus, the drive torque during driving mode of the hybrid vehicle may be applied by both drive units or by only a single drive unit. A vehicle is known from published European patent document EP 0 224 144 A1 which has a conventional main drive axle which is drivable by an internal combustion engine. With increased slip of the wheels of the main drive axle, the wheels of a connectable drive axle may be automatically driven with the aid of a separate auxiliary drive unit, in particular an electric motor.

BRIEF SUMMARY OF THE INVENTION

The device according to the present invention for a vehicle having an electric machine and an axle which is drivable by the electric machine is characterized in that the disengageable mechanical coupling between the drivable axle and the electric machine is designed as a simple, robust mechanical component. This disengageable mechanical coupling is designed as a jaw coupling. The technical background of this embodiment is that the electric machine may be disengaged from the drivable axle. The electric machine is disengaged from the drivable axle using a jaw coupling. Necessary synchronizations for the engagement are carried out with the aid of the electric machine. The advantage of this embodiment is that a robust design which is economical and maintenance- and wear-free may be used as a coupling. In various driving situations of a hybrid vehicle it is advantageous to decouple the electric machine from the rear axle. For example, an electric machine is not able to deliver appreciable torque at high rotational speeds. When no gearbox is provided between the electric machine and the drivable axle, for space or cost reasons, for example, it is advantageous from an energy standpoint to decouple the electric machine from the drive axle at high rotational speeds in order to avoid co-rotation of the electric machine and the associated losses. For the same reason, it is advantageous to decouple the electric machine from the driven axle when the vehicle is freely rolling. The free rolling of the vehicle is also referred to as "cruising."

The method according to the present invention for a vehicle having an electric machine and an axle which is drivable by the electric machine, in which a disengageable mechanical coupling is provided between the drivable axle and the electric machine, is characterized in that the mechanical coupling is designed as a jaw coupling, and the jaw coupling is activated as a function of the operating state of the vehicle. Continuous co-rotation of the electric machine is advantageously avoided in this way.

In one refinement of the present invention, it is provided that at least the "acceleration" and "recuperation" operating states of the vehicle are recognized. The technical background of this embodiment is that the acceleration operation is assisted by the electric machine, in particular at lower rotational speeds of the driven axle. The electric machine is likewise coupled to the drivable axle during the "recuperation" operating state. In this case, however, a torque of the rotating axle is transmitted to the electric machine, which is thus able to recuperate kinetic energy of the vehicle. The advantage of this embodiment is that the electric machine efficiently assists the vehicle during the "acceleration" operating state, and during the "recuperation" operating state of the vehicle, kinetic energy of the vehicle is converted into electrical energy with the aid of the electric machine.

In another refinement of the present invention, it is provided that the jaw coupling is engaged during the "acceleration" operating state of the vehicle. The technical background of this embodiment is that the acceleration operation is assisted by the electric machine, in particular at low rotational speeds of the driven axle. The advantage of this embodiment is that the electric machine efficiently assists the vehicle during the "acceleration" operating state.

In another refinement of the present invention, after acceleration of the drivable axle is completed, the jaw coupling is disengaged and the electric machine is braked by recuperation of the rotational energy of the electric machine. The technical background and the advantage of this embodiment of the present invention is that the kinetic energy of the coasting electric machine is converted into electrical energy and is not lost. The electrical energy may be supplied to a battery or other consumers via the vehicle's power supply.

Another refinement of the present invention provides that the jaw coupling is engaged during the "recuperation" operating state of the vehicle. The technical background and advantage of this embodiment is that during the "recuperation" operating state of the vehicle, with the aid of the engaged jaw coupling the kinetic energy of the vehicle is converted into electrical energy by the electric machine and is not lost. The electrical energy may be supplied to a battery or other consumers via the vehicle's power supply.

Another refinement of the present invention provides that the jaw coupling is activated in such a way that the influence on the rotational speed of the drivable axle is minimal. The technical background of this embodiment is that during the activation of the jaw coupling the mechanical coupling is not subjected to excessively high mechanical stress. The advantage of this embodiment is that the driving comfort is not affected during the activation of the jaw coupling.

In another refinement of the present invention, it is provided that in the electric machine is accelerated to slightly less than or slightly greater than the speed of the drivable axle before the jaw coupling is activated. The technical background of this embodiment is that a gentle engagement of the jaw coupling is possible. The advantages of this embodiment are a low mechanical stress on the jaw coupling and increased comfort during activation of the jaw coupling.

In another refinement of the present invention, it is provided that the method, a braking torque is generated at the drivable axle, and jaw coupling (102) is disengaged, during the "recuperation" operating state of the vehicle and when an event signal is present. The technical background of this embodiment is that during the "recuperation" operating state of the vehicle an excessively high braking torque, which is caused in particular by the electric machine, results in slip at the drive wheels of the drivable axle. This may result in an unstable driving dynamic characteristic (skidding, for example) of the vehicle. The excessively high braking torque may be caused, for example, by a malfunction in the electric drive, in particular a short circuit of the electric machine. During this situation, a high torque is transmitted via the jaw coupling, and disengagement of the jaw coupling is therefore not possible. To allow disengagement, the torque to be transmitted via the jaw coupling must be minimized or changed in direction. For this purpose, the drivable axle is briefly and intensely braked, for example with the aid of the brakes at the drive wheels mounted on the drivable axle. At this moment the jaw coupling is disengaged, and the faulty braking torque is decoupled from the drivable axle. The drive wheels then accelerate over the roadway. Safe operation with regard to driving dynamics is possible with the aid of the static friction force which is once again present. The drivable axle is briefly braked as a response to the presence of an event signal. The event signal is emitted by a control unit when an error is diagnosed in the electric drive (in particular a high braking torque at the drivable axle which is not caused by the brakes of the drive wheels), when the electric machine has a high braking torque, and/or before the electric machine is short-circuited. The advantage of this embodiment is that safe operation of the vehicle is thus ensured, even at a high braking torque of the electric machine.

In another refinement of the present invention, it is provided that the jaw coupling is disengaged during the operating states of the vehicle in which the electric machine is not to deliver energy to the drivable axle nor receive energy from the drivable axle. The technical background of this embodiment is that the electric machine may be decoupled from the drivable axle, and therefore the inert mass advantageously does not have to be carried along or accelerated in every driving situation. In particular, these are the operating states of the vehicle during which the electric machine is not to deliver energy to the axle nor receive energy from the drivable axle.

DETAILED DESCRIPTION OF THE INVENTION

Figure 1:
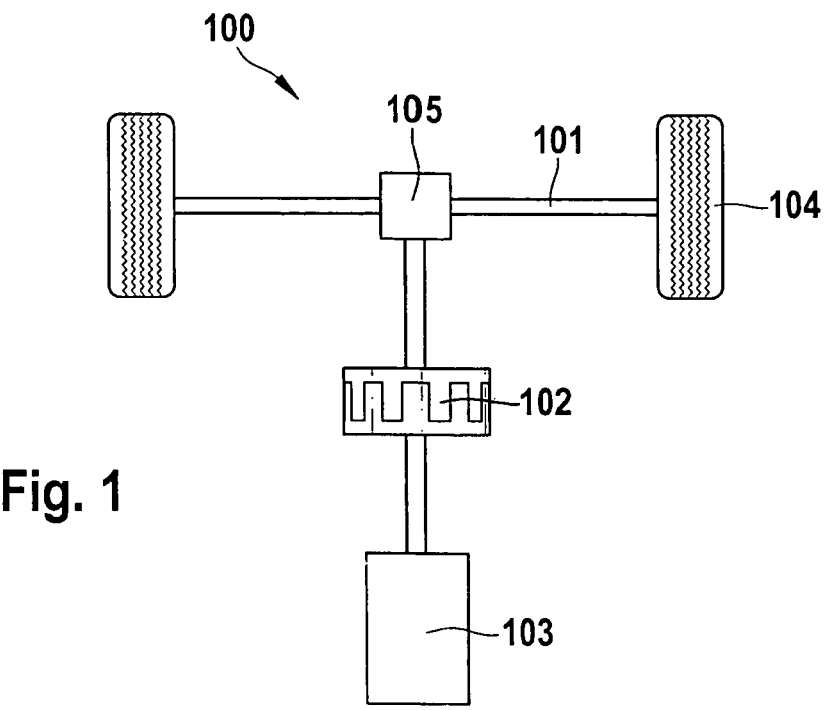
FIG. 1 shows a schematic illustration of a drive having an electrically drivable axle.

FIG. 1 shows a schematic illustration of a drive having an electrically drivable axle 100 which has an electric machine 103, and an electrically drivable axle 101 having drive wheels 104 and a differential 105. The mechanical coupling between electric machine 103 and electrically drivable axle 101 is implemented with the aid of a jaw coupling 102. When jaw coupling 102 is engaged, a torque may be transmitted from the electric machine to the drivable axle, or vice versa. When the jaw coupling is disengaged, no torque may be transmitted from the electric machine to the drivable axle, or vice versa.

Figure 2:
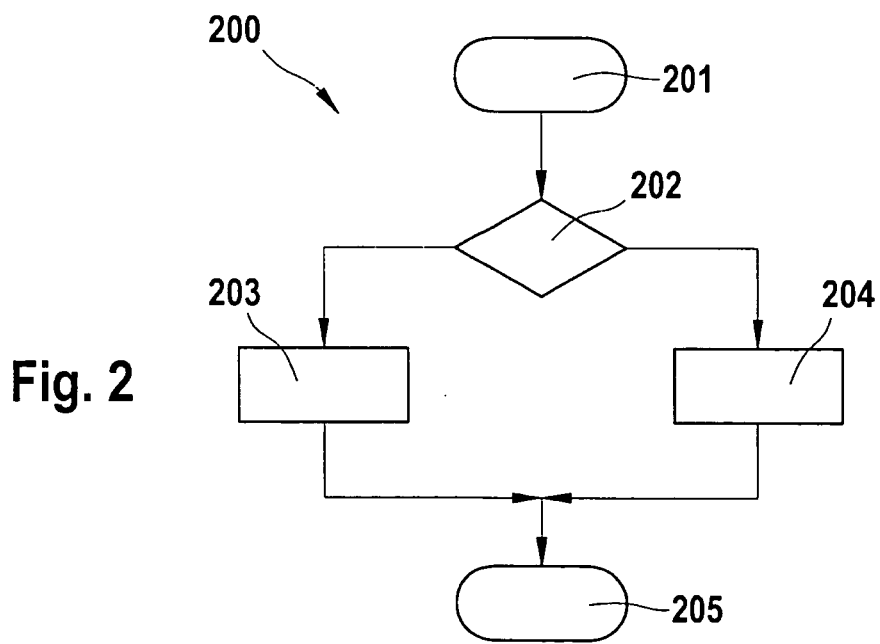
FIG. 2 shows a method for operating an electrically drivable axle.

FIG. 2 shows a method for operating an electrically drivable axle 200. The method is started in step 201. In step 202 the operating state of the vehicle is subsequently queried. In the present exemplary embodiment, the system is able to recognize the "recuperation" and "acceleration" operating states. When either the "acceleration" or the "recuperation" operating state is recognized at the given moment, the method branches to step 203, in which the jaw coupling is engaged. This ensures that a torque may be transmitted from electric machine 103 to drivable axle 101, or vice versa, via jaw coupling 102. If neither of the two operating states of the vehicle is recognized in step 202, then the method branches to step 204, in which the jaw coupling is disengaged. This ensures that no torque may be transmitted from electric machine 103 to the drivable axle, or vice versa, via jaw coupling 102. After jaw coupling 102 is activated in method steps 204 or 203, the method is terminated with step 205. This method is continuously repeated during the operation of the vehicle.

What is claimed is:

1. A drive device for a vehicle, comprising:
   an axle;
   an electric machine configured to selectively drive the axle;
   a control unit; and
   a selectively disengageable mechanical coupling provided between the axle and the electric machine, wherein the mechanical coupling is configured as a jaw coupling and the control unit triggers a braking of the axle and a disengagement of the jaw coupling responsive to a diagnosed electric machine error,
   wherein the jaw coupling is selectively engaged at least during an acceleration operating state of the vehicle and during a recuperation operating state of the vehicle, wherein the kinetic energy of the vehicle is converted into electrical energy by the electric machine in the recuperation operation state,
   wherein the electric machine error is diagnosed when the electric machine has a braking torque exceeding a threshold.

2. A method for operating a drive device for a vehicle having an axle, an electric machine configured to selectively drive the axle, and a selectively disengageable mechanical coupling provided between the axle and the electric machine, wherein the mechanical coupling is configured as a jaw coupling, the method comprising:
   selectively activating the jaw coupling as a function of an operating state of the vehicle;
   diagnosing an electric machine error;
   triggering a braking of the axle responsive to diagnosing the error; and
   disengaging the jaw coupling after triggering the braking,
   wherein the jaw coupling is selectively engaged at least during an acceleration operating state of the vehicle and during a recuperation operating state of the vehicle, wherein the kinetic energy of the vehicle is converted into electrical energy by the electric machine in the recuperation operating state,
   wherein the electric machine error is diagnosed when the electric machine has a braking torque exceeding a threshold.

3. The method as recited in claim 2, wherein the jaw coupling is selectively engaged during the acceleration operating state of the vehicle.

4. The method as recited in claim 3, wherein after acceleration of the axle is completed, the jaw coupling is disengaged and the electric machine is braked by recuperation of the rotational energy of the electric machine.

5. The method as recited in claim 3, wherein the jaw coupling is selectively engaged during the recuperation operating state of the vehicle.

6. The method as recited in claim 2, wherein the jaw coupling is activated in such a way that the influence on the rotational speed of the axle is minimal.

7. The method as recited in claim 6, wherein the electric machine is accelerated to slightly less than or slightly greater than the speed of the axle before the jaw coupling is activated.

8. The method as recited in claim 2, wherein during the recuperation operating state, a braking torque is generated at the axle and the jaw coupling is disengaged when an event signal is present.

9. The method as recited in claim 2, wherein the jaw coupling is disengaged during selected operating states of the vehicle, wherein the selected operating states include an operating state in which the electric machine is not to deliver energy to the axle and an operating state in which the electric machine is not to receive energy from the axle.

10. A method for operating a drive device for a vehicle having an axle, an electric machine configured to selectively drive the axle, and a selectively disengageable mechanical coupling provided between the axle and the electric machine, wherein the mechanical coupling is configured as a jaw coupling, the method comprising:
 selectively activating the jaw coupling as a function of an operating state of the vehicle;
 diagnosing an electric machine error;
 triggering a braking of the axle responsive to diagnosing the error; and
 disengaging the jaw coupling after triggering the braking, wherein the jaw coupling is selectively engaged at least during an acceleration operating state of the vehicle and during a recuperation operating state of the vehicle, wherein the kinetic energy of the vehicle is converted into electrical energy by the electric machine in the recuperation operating state,
 wherein the electric machine error is diagnosed when a braking torque at the axle which is not caused by a brake of the drive wheel exceeds a threshold.

11. A method for operating a drive device for a vehicle having an axle, an electric machine configured to selectively drive the axle, and a selectively disengageable mechanical coupling provided between the axle and the electric machine, wherein the mechanical coupling is configured as a jaw coupling, the method comprising:
 selectively activating the jaw coupling as a function of an operating state of the vehicle;
 diagnosing an electric machine error;
 triggering a braking of the axle responsive to diagnosing the error; and
 disengaging the jaw coupling after triggering the braking, wherein the jaw coupling is selectively engaged at least during an acceleration operating state of the vehicle and during a recuperation operating state of the vehicle, wherein the kinetic energy of the vehicle is converted into electrical energy by the electric machine in the recuperation operating state,
 wherein the electric machine error is diagnosed before the electric machine is going to be short circuited.

12. A method for operating a drive device for a vehicle having an axle, an electric machine configured to selectively drive the axle, and a selectively disengageable mechanical coupling provided between the axle and the electric machine, wherein the mechanical coupling is configured as a jaw coupling, the method comprising:
 selectively activating the jaw coupling as a function of an operating state of the vehicle;
 diagnosing an electric machine error;
 triggering a braking of the axle responsive to diagnosing the error;
 braking the axle until a torque at the jaw coupling is reduced to a point where the jaw coupling is disengageable; and
 disengaging the jaw coupling after triggering the braking, wherein the jaw coupling is selectively engaged at least during an acceleration operating state of the vehicle and during a recuperation operating state of the vehicle, wherein the kinetic energy of the vehicle is converted into electrical energy by the electric machine in the recuperation operating state.

13. The method as recited in claim 12, wherein the electric machine error is diagnosed when the electric machine has a braking torque exceeding a threshold.

\* \* \* \* \*